(12) United States Patent
Yamashita et al.

(10) Patent No.: US 6,813,952 B2
(45) Date of Patent: Nov. 9, 2004

(54) PRESSURE SENSOR DEVICE HAVING TEMPERATURE SENSOR

(75) Inventors: Yasuhiro Yamashita, Nukata-gun (JP); Kyutaro Hayashi, Takahama (JP); Yukihiro Kato, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/791,892

(22) Filed: Mar. 4, 2004

(65) Prior Publication Data

US 2004/0182163 A1 Sep. 23, 2004

(30) Foreign Application Priority Data

Mar. 19, 2003 (JP) .......................................... 2003-075018

(51) Int. Cl.[7] .............................................. G01L 19/04
(52) U.S. Cl. ............................. 73/708; 73/700; 374/201
(58) Field of Search ....................... 73/700–727; 374/201

(56) References Cited

U.S. PATENT DOCUMENTS 5,499,535 A * 3/1996 Amano et al. ................. 73/717
6,003,379 A * 12/1999 Ichikawa et al. .............. 73/708
6,439,056 B1 * 8/2002 Jonsson ........................ 73/708

FOREIGN PATENT DOCUMENTS

JP        A-2001-133333        5/2001
JP        A-2002-131158        5/2002

OTHER PUBLICATIONS

U.S. patent application Ser. No. 10/690,812, Hayashi et al., filed Oct. 23, 2003.

* cited by examiner

Primary Examiner—Edward Lefkowitz
Assistant Examiner—Alandra Ellington
(74) Attorney, Agent, or Firm—Posz & Bethards, PLC

(57) ABSTRACT

A pressure sensor device having a temperature sensor includes a pressure sensor, a temperature sensor, a sensor casing for accommodating the pressure sensor and a connector pin for electrically connecting the pressure sensor to an outside circuit, and an inlet port mounted on the sensor casing and having a pressure introduction port for introducing a measuring object to the pressure sensor. The temperature sensor comprises a temperature sensing element and a pair of lead wires and is disposed in the pressure introduction port. The lead wires of the temperature sensor are welded to and supported by the connector pin. One of the lead wires is formed as a U-shape and inserted into the pressure introduction port while the U-shaped lead wire is inwardly depressed, so that a reaction force is generated at the lead wire, which outwardly urges the lead wire and the temperature sensing element to an inner wall of the pressure introduction port. As a result, the temperature sensor is firmly fixed to the sensor device of a smaller size and a vibration of the temperature sensor can be suppressed.

12 Claims, 5 Drawing Sheets

PRESSURE SENSOR DEVICE HAVING TEMPERATURE SENSOR

CROSS REFERENCE TO RELATED APPLICATION

This application is based on Japanese Patent Applications No. 2003-75018 filed on Mar. 19, 2003, the disclosures of which are incorporated herein by reference.

FIELD OF THE INVENTION

The present invention relates to a pressure sensor device for detecting pressure of a measuring object, and more particularly to a pressure sensor device having a pressure sensor and a temperature sensor for detecting both pressure and temperature of the measuring object. The present invention further relates to a method of fixing the temperature sensor in the pressure sensor device.

BACKGROUND OF THE INVENTION

A pressure sensor device having a temperature sensor, i.e., the pressure sensor device integrated with the temperature sensor, is, for example, used for an internal combustion engine of an automotive vehicle. The device detects both pressure and temperature of intake air as a measuring object in an intake manifold of the engine, so that the device outputs a measurement signal to a controller. The controller calculates and outputs a control signal to an engine of the vehicle so that the engine is controlled.

A conventional pressure sensor device will be explained with reference to FIG. 6. The pressure sensor device (1) includes a sensor casing (3), a connector pin (11), a pressure sensor (which comprises a pressure sensor chip 5, a mold IC 2 and so on), and a temperature sensor (21). The connector pin (11) is connected to an outside circuit such as an electronic control unit (i.e., ECU) as a controller of the vehicle. Each of the pressure sensor (2 and 5) and the temperature sensor (21) are electrically connected to the connector pin (11), respectively. Particularly, the temperature sensor (21) is connected to the connector pin (11) at a connection portion (20) through a pair of lead wires (19). The lead wire (19) is protruded from the connection portion (20). The temperature sensor (21) is disposed on one end of the lead wire (19), and the connection portion (20) is disposed on the other end of the lead wire (19). Thus, the temperature sensor (21) is accommodated in a temperature sensor chamber (16b) so that the temperature sensor (21) is supported by the connection portion (20) through the lead wire (19). In other words, the temperature sensor (21) is floated in the temperature sensor chamber (16b) with using the lead wire (19) as a support.

An inlet port (13) is adhered to the sensor casing (3) and a partition plate (40) is formed in a lower portion (a pressure introduction port 16) of the inlet port (13) so as to divide into two parts, one of which is a pressure introduction passage (16a) and the other is the temperature sensor chamber (16b).

As mentioned above, since the connection portion (20) is only the support of the temperature sensor (21), the temperature sensor (21) is vibrated sympathetically with the connection portion as a supporting point in a case where a vibration is applied to the sensor device (1). Accordingly, a stress is applied to the connection portion (20) repeatedly, so that the lead wire (19) may be broken at the connection portion (20). Moreover, the lead wire (19) or the temperature sensor (21) may hit an inner wall of the temperature sensor chamber (16b), so that the lead wire (19) or the temperature sensor (21) is broken.

In order to solve the above mentioned problem, inventors of the same applicant of this invention have proposed a new temperature and pressure sensor device, which is disclosed in Japanese Patent Application of No. 2002-308982 filed on Oct. 23, 2002. Such a new sensor device will be explained for reference with reference to FIG. 7. In this device shown in FIG. 7, a vibration reduction means (41), such as a buffer made of synthetic resin, is provided between a lead wire (19) and an inner wall of a pressure introduction port (16), in order to suppress the vibration applied to a temperature sensor (21). It is, however, disadvantageous in that a lower end of the pressure introduction port of the inlet port shall be divided into two parts, one for passing through a measuring object to a pressure sensor and the other for holding the temperature sensor. As a result, such lower end of the inlet port will be larger and it will become harder to mount a sensor device onto an internal combustion engine.

SUMMARY OF THE INVENTION

It is, therefore, an object of the present invention to provide a smaller pressure sensor device having a temperature sensor, in which the temperature sensor is rigidly held to suppress a vibration thereof, and to provide a method of fixing and holding the temperature sensor in the pressure sensor device.

According to a feature of this invention, a pressure sensor device comprises a pressure sensor for detecting pressure of a measuring object, a temperature sensor for detecting temperature of the measuring object, a sensor casing for accommodating the pressure sensor and a connector pin, which are electrically connected to the pressure sensor and an outside circuit, an inlet port mounted on the sensor casing and having a pressure introduction port for introducing the measuring object to the pressure sensor disposed in the sensor casing, wherein the temperature sensor is disposed in the pressure introduction port. The temperature sensor comprises a pair of lead wires and a temperature sensing element, wherein the pair of lead wires is connected at its one end to the connector pin and to the temperature sensing element at the other end, so as to electrically connect the sensing element with the outside circuit as well as to mechanically support and hold the sensing element in the pressure introduction port. The pair of lead wires is made of elastic metal and supports the sensing element with an elastically deformed condition so that a reaction force of the lead wires is applied to the lead wires and the sensing element to urge and press the sensing element to an inner wall of the pressure introduction port.

As a result, the temperature sensor of the lead wires and sensing element are rigidly fixed to the pressure sensor device at a contact point between the sensing element and the inner wall and at another contact point between the lead wire and the inner wall of the port, other than at the connection portion at which the one ends of the lead wires are welded to the connector pin. In this sensor device, accordingly, the vibration to be applied to the temperature sensor can be suppressed and its durability is improved.

Since the temperature sensor is disposed in the pressure introduction port and rigidly held at its position by use of the reaction force of the lead wires, it is possible to pass the measuring object to the pressure sensor through the pressure introduction port. It is, therefore, not necessary to divide the pressure introduction port into two parts, one for passing the measuring object to the pressure sensor and the other for holding the temperature sensor. Accordingly, an outer diameter of the pressure introduction port can be made smaller and it becomes easier to mount the sensor device of a smaller size onto an internal combustion engine.

In the embodiment of the present invention, one end of the lead wire is formed as a U-shape and this U-shaped portion of the lead wire is elastically deformed when the temperature sensor is inserted into the pressure introduction port, so that an reaction force generated by this deformed U-shaped portion is applied to the lead wire and the temperature sensing element to outwardly urge them towards the inner wall of the port. As a result, vibration of the temperature sensor is suppressed.

Another feature of this invention relates to a fixing method of the temperature sensor to the pressure sensor device of the above mentioned construction. The feature of this fixing method comprises a step of forming one end of the lead wire as a U-shape, so that a distance between the sensing element and the opposing lead wire becomes larger than an inner diameter of the pressure introduction port while a distance of the opposing portions of the U-shaped lead wire is made smaller than the inner diameter; a step of connecting ends of the pair of the lead wires to the connector pin; a step of inserting the temperature sensor (the temperature sensing element and the lead wires) into the pressure introduction port of the inlet port; and a step of adhering the inlet port to the sensor casing, wherein at the step of inserting the temperature sensor into the pressure introduction port, a part of the lead wires is elastically deformed so as to generate a reaction force at the lead wires and to urge, by the use of this reaction force, the temperature sensing element to the inner wall of the pressure introduction port, thereby to rigidly hold the temperature sensor in the sensor device.

BRIEF DESCRIPTION OF THE DRAWINGS

The above and other objects, features and advantages of the present invention will become more apparent from the following detailed description made with reference to the accompanying drawings. In the drawings.

Figure 1A:
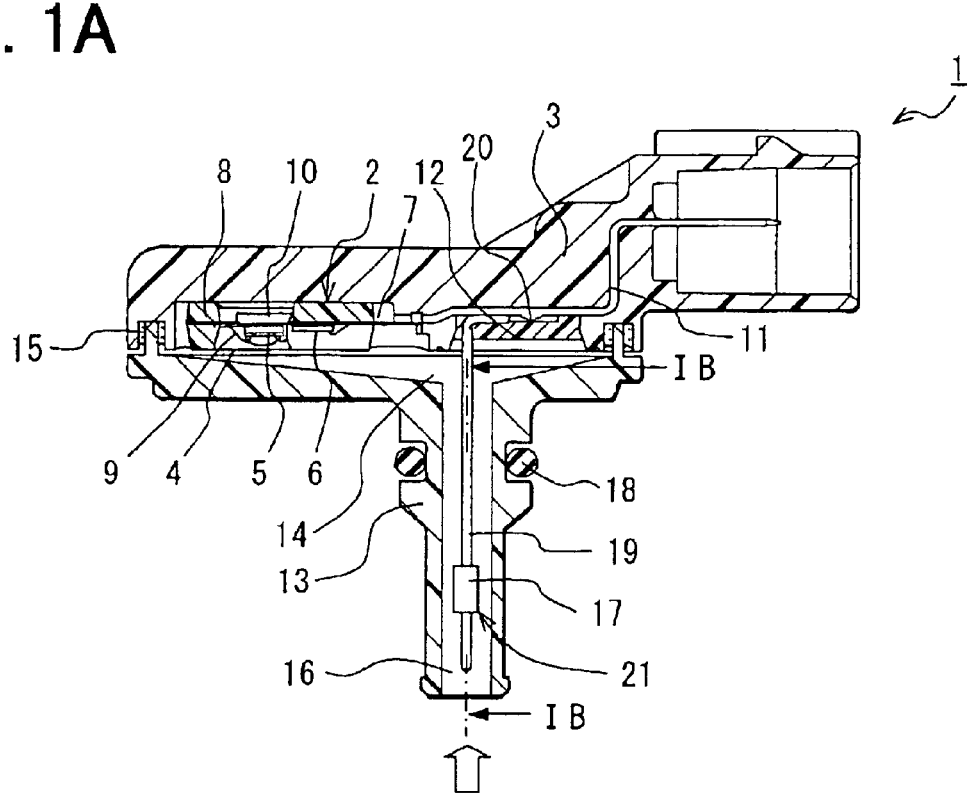
FIG. 1A is a schematic cross-sectional view showing a pressure sensor device having a pressure sensor and a temperature sensor according to a first embodiment of the present invention.

DETAILED DESCRIPTION OF THE PREFERRED EMBODIMENTS (First Embodiment)

A pressure sensor device 1 having a temperature sensor according to a first embodiment of the present invention is shown in FIG. 1. The pressure sensor device 1 detects, for example, both pressure and temperature of intake air as a measuring object in an intake manifold of an internal combustion engine for an automotive vehicle. The device 1 includes a sensor casing 3. A mold IC (i.e., integrated circuit) 2 as a pressure detection element having a pressure sensor chip 5 is disposed in the sensor casing 3. The mold IC 2 includes a fixation portion 4 having a concavity, in which the pressure sensor chip 5 is mounted. The pressure sensor chip 5 detects the pressure of the measuring object. The mold IC 2 further includes a signal processor IC 6 and a lead frame 7.

The signal processor IC 6 magnifies a measurement signal outputted from the pressure sensor chip 5. The lead frame 7 outputs a magnified measurement signal from the signal processor IC 6. The signal processor IC 6 and the lead frame 7 are molded with mold resin 8 such as an epoxy resin material, so that both the signal processor IC 6 and the lead frame 7 are protected. Thus, the mold IC 2 is formed and molded.

The sensor casing 3 is made of heat resistant resin such as poly-buthylene terephthalate (i.e., PBT) or poly-phenylene sulfide (i.e., PPS). A protection member (not shown) covers the fixation portion 4 so that the pressure sensor chip 5 is protected by the protection member. Therefore, the pressure sensor chip 5 can be operated under an excellent performance.

A pressure receiving surface of the pressure sensor chip 5 faces an opening portion of the fixation portion 4 so that the pressure is applied to the pressure receiving surface. The pressure sensor chip 5 and the lead frame 7 are electrically connected together with a wire 9 such as gold by a wire bonding method. The pressure sensor chip 5 includes a diaphragm made of single crystal silicon and a plurality of diffusion resistances disposed on the diaphragm. The diffusion resistances are connected together with a bridge connection. The pressure sensor chip 5 is, for example, adhered to a base 10 by a glass bonding method and the like. The base 10 is made of glass. The base 10 is also adhered to a bottom surface of the fixation portion 4 with using silicon resin and the like.

The lead frame 7 is electrically connected to a connector pin 11, which is connected to an outside circuit (not shown) such as ECU of the vehicle. The connection portion between the lead frame 7 and the connector pin 11 is sealed with a potting member 12 made of a fluorine compound, a polyamide, an epoxy resin and the like. Preferably, the potting member 12 is made of fluorine resin having high chemical resistance.

An inlet port 13 is mounted on the sensor casing 3 through an adhesive 15 so that a pressure chamber 14 is formed between the sensor casing 3 and the inlet port 13. The inlet port 13 is made of resin material having high chemical resistance such as PBT or PPS. The adhesive 15 has high elasticity and high chemical resistance such as hard epoxy resin and the like.

The inlet port 13 protrudes to the outside, which is opposite to the sensor casing 3. A pressure introduction port 16 is disposed inside the inlet port 13. The pressure introduction port 16 leads from the protruded end of the inlet port 13 to the pressure chamber 14, so that the measuring object is introduced to the pressure receiving surface of the pressure sensor chip 5. In this pressure introduction port 16, a temperature sensing element 17 is disposed, which is, for example, made of a cylindrical NTC-termister.

An O-ring 18 is disposed outside the inlet port 13. The pressure sensor device 1 is mounted in a mounting portion of an internal combustion engine of the vehicle (not shown) through the O-ring 18 air-tightly.

The temperature sensing element 17 is made of metallic material such as Co, Mn and Ni, and connected with a pair of lead wires 19a and 19b, which are made of Ni, Cu, Cu—Ni alloy and so on. The other (open) ends of the lead wires 19a and 19b are fixed to the connector pin 11 at a connection portion 20 by using welding method. The connector pin 11 is insert-molded into the sensor casing 3. A temperature sensor 21 is composed of the temperature sensing element 17 and lead wires 19, wherein the temperature sensing element 17 and one of the lead wire 19b are respectively pressed against an inside wall of the pressure introduction port 16, as shown in FIG. 1B and FIG. 1C.

Figure 1B:
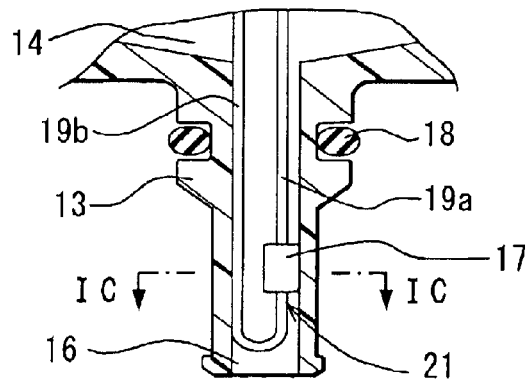
FIG. 1B is an enlarged schematic cross-sectional view showing a pressure sensor device taken along a one-dot-chain line IB—IB in FIG. 1A.
Figure 1C:
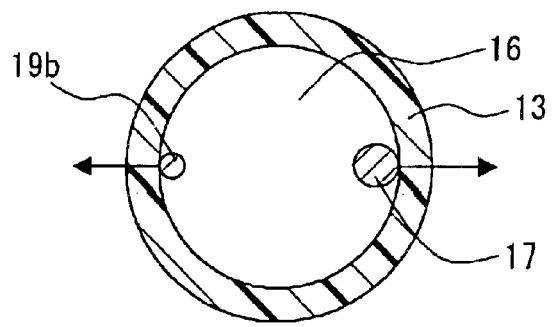
FIG. 1C is an enlarged schematic cross-sectional view of a pressure sensor device taken along a one-dot-chain line IC—IC in FIG. 1B.

When a pressure is applied to the pressure sensor device 1 in a direction of an arrow shown in FIG. 1A, the measuring object is introduced into the pressure receiving surface of the pressure sensor chip 5 in the sensor casing 3 through the pressure introduction port 16 of the inlet port 13. A diaphragm of the pressure sensor chip 5 is deformed in proportion to the pressure of the measuring object. A value of a diffusion resistance (not shown) of the pressure sensor chip 5 changes in proportion to the deformation of the diaphragm. This value change is measured by a bridge circuit, so that the bridge circuit outputs a signal voltage. Then, the signal voltage is magnified with the signal processor IC 6, and the magnified signal voltage is outputted to the outside circuit through the lead frame 7 and the connector pin 11. The temperature of the measuring object is detected by the temperature sensor 21, which is disposed in the pressure introduction port 16. A temperature signal is likewise outputted to the outside circuit through the connector pin 1.

Figure 2A:
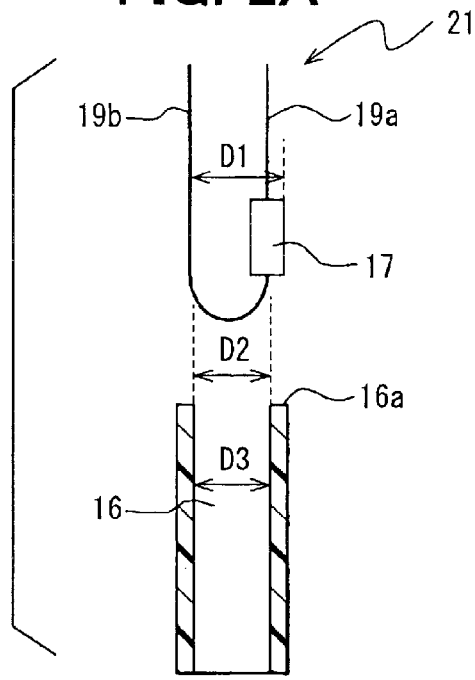
FIG. 2A is a schematic view of a temperature sensor and a pair of lead wires before being inserted into a pressure introduction port.
Figure 2B:
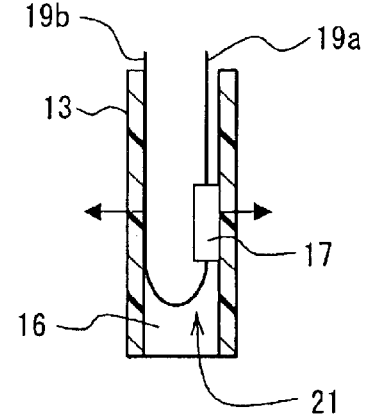
FIG. 2B is a schematic view of the above temperature sensor and the lead wires after they are inserted into and fixed to the pressure introduction port.

As mentioned above, the temperature sensor 21 is composed of the sensing element 17 and the pair of lead wires 19a and 19b, as more in detail shown in FIG. 2A and FIG. 2B. Now a method of fixing the temperature sensor 21 in the sensor device 1 is explained. At first, a lower end of the lead wire 19b is so formed as a U-shape before the temperature sensor 21 is inserted into the pressure introduction port 16, so that a distance D1 between the lead wire 19b and a side surface of the sensing element 17 is larger than a distance D3 of the opposing inner surfaces of the pressure introduction port 16 (i.e. the inner diameter of the cylindrical port 16), while a distance D2 between the opposing portions of the U-shaped lead wire 19b is made equal to or smaller than the inner diameter D3. Then the upper (open) ends of the lead wires 19a and 19b are connected to the connector pin 11 at the connection portion 20 by welding or the like.

The inlet port 13 is then fixed to the sensor casing 3, in which the temperature sensor 21 is inserted into the pressure introduction port 16, more exactly, the U-shaped lead wire 19b and the temperature sensing element 17 are inserted into the port 16 along with the lead wire 19a.

At this insertion of the temperature sensor 21 into the port 16, since the distance D2 between the opposing portions is smaller than the inner diameter D3 of the port 16, the U-shaped end of the lead wire 19b can be smoothly inserted into the port 16. When the temperature sensor 21 is further inserted into the port 16, then one end of the sensing element 17 will be in contact with an end wall 16a of the port 16. And when the temperature sensor 21 is further inserted into the port 16, the U-shaped lead wire 19b will be elastically deformed, namely the sensing element 17 and the opposing portion of the lead wire 19b will be inwardly pressed, so that the sensing element 17 as well as the lead wire 19b are further inserted into the port, in which the elastically deformed lead wire 19b and the sensing element are kept in contact with the inner wall of the port 16. As above, the temperature sensor 21 is inserted into and held in the port at a desired position.

As already mentioned above, the distance D1 between the lead wire 19b and the sensing element 17 is so made as to be larger than the inner diameter D3 of the port 16, before being inserted into the port 16. Accordingly, at a condition that the temperature sensor 21 is inserted into and held in the port 16, the above distance is reduced to the distance D3, so that a reaction force is generated at the U-shaped portion of the lead wire 19b for outwardly urging the sensing element 17 and the opposing portion of the lead wire 19b. As a result, the lead wire 19b and the sensing element 17 are outwardly pressed against the inner wall of the port 16, so that the temperature sensor 21 is rigidly fixed to the port 16.

Furthermore, since the temperature sensor 21 is held in the sensor device 1 at other contact points than the connection portion 20, a vibration of the temperature sensor 21 can be suppressed.

Figure 7:
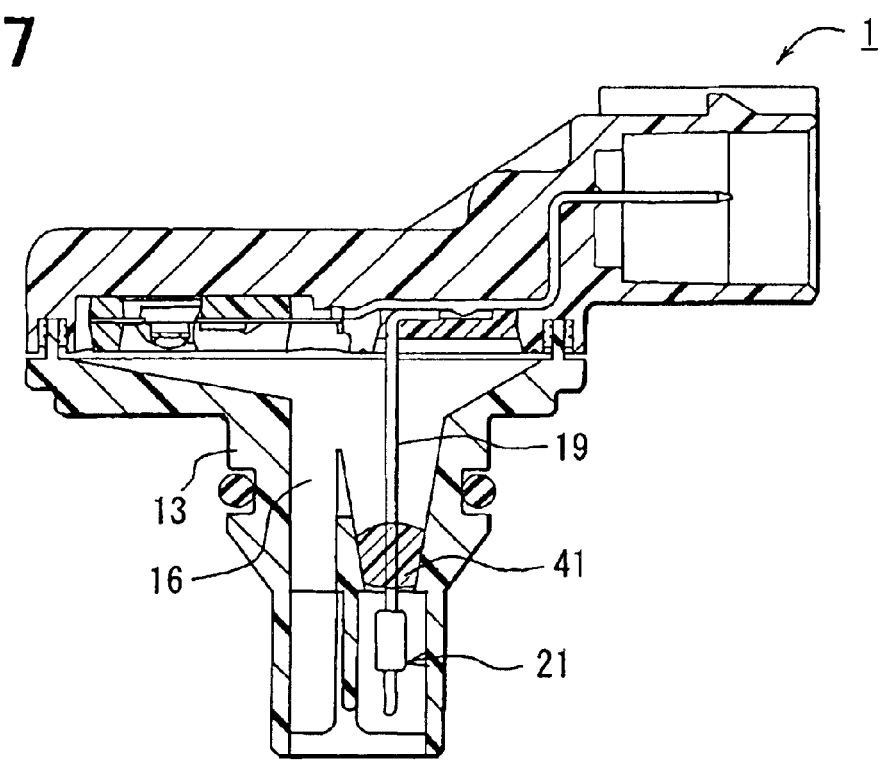
FIG. 7 is a cross-sectional view showing a pressure sensor device according to a new temperature and pressure sensor device, which is proposed by inventors of the same applicant, and which is disclosed in Japanese Patent Application of No. 2002-308982 filed on Oct. 23, 2002.

Furthermore, since it is not necessary to provide a buffer for protecting or suppressing the vibration of the temperature sensor 21, a passage for the measuring object in the pressure introduction port 16 can be made larger, compared with a pressure sensor device in which two passages are provided as shown in FIG. 7, or in other words, the outer diameter of the port 16 can be made smaller, even when the temperature sensor 21 is disposed in the passage of port 16, which makes it possible that the sensor device 1 can be flexibly designed for mounting the same to the internal combustion engine, or a step for mounting the same to the engine can be easier.

In the above embodiment, the cylindrical temperature sensing element 17 is used and the temperature sensor 21 is rigidly fixed in the sensor device by the use of the reaction force of the lead wire 19b, which outwardly urges the lead wire 19b and the sensing element 17 towards the inner surface of the pressure introduction port 16. A configuration of the sensing element 17 shall not be limited to the shape of the cylinder and both of the lead wires 19a and 19b can be so arranged that both of them are kept in contact with the inner wall of the pressure introduction port 16.

Figure 3A:
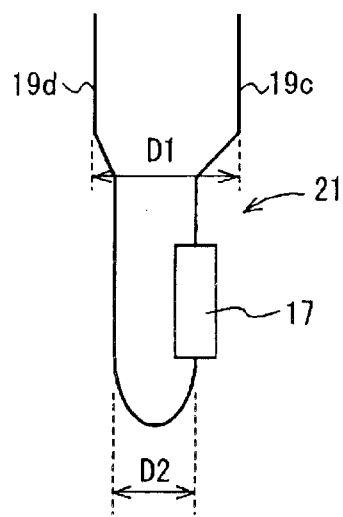
FIGS. 3A to 3C are schematic views showing the lead wires according to modifications thereof.
Figure 3B:
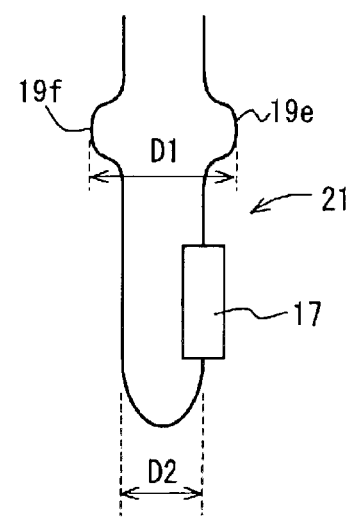
Figure 3C:
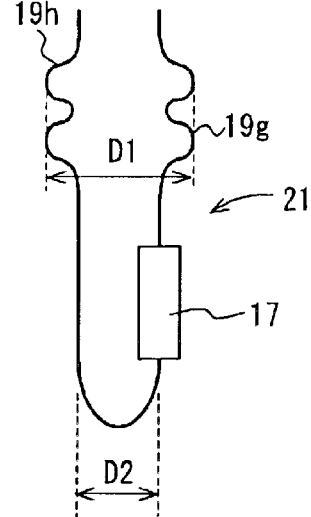

Furthermore, in the above embodiment, the U-shaped lead wire 19b is explained. The lead wires 19, however, shall not be limited to this U-shape, and any other forms of the lead wires can be possible so that any portion of the lead wire(s) and/or the sensing element are pressed against the inner wall of the port by means of the reaction force. For example, the upper portions 19c and 19d of the lead wires can be bent outwardly, as shown in FIG. 3A, or they are outwardly protruded, as shown in FIG. 3B, or furthermore, they are formed as a meandering shape, as shown in FIG. 3C. Furthermore, when the portions of the lead wires are partly bent as shown in FIGS. 3A, 3B or 3C, a pressure generating at the connection portion 20 by the elastic deform of the wires 19 can be relieved at the insertion of the temperature sensor 21 into the pressure introduction port 16.

In the above variations of the lead wires shown in FIGS. 3A to 3C, a distance D1 between contacting points, at which the lead wires will be in contact with the inner wall of the pressure introduction port 16 when the temperature sensor is inserted thereinto, is formed between the lead wires 19c and 19d in a variation of FIG. 3A, between the outwardly protruded portions 19e and 19f in a further variation of FIG. 3B, and likewise between the outwardly protruded portions 19g and 19h in a further variation of FIG. 3C.

Figure 4A:
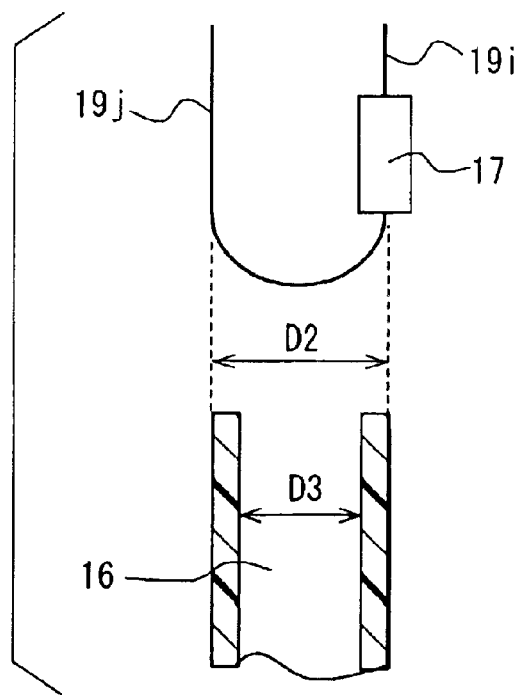
FIGS. 4A and 4B are the schematic views showing the lead wires according to a further modification thereof, before the lead wires are inserted into the port.
Figure 4B:
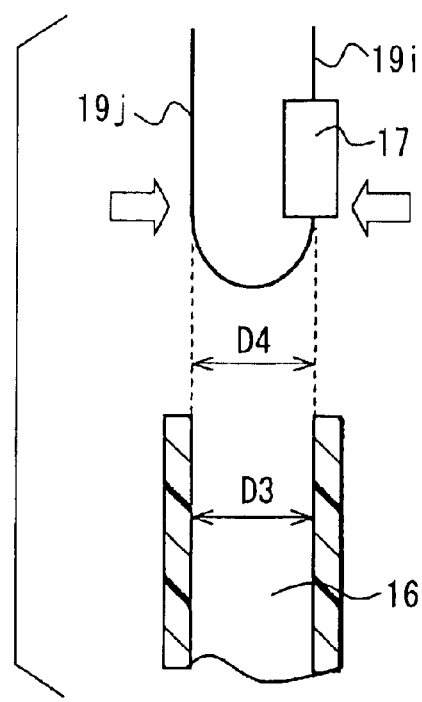

In the above variations of the lead wires, a distance D2 of the opposing portions of the lead wire at its lower end is smaller than the inner diameter D3 of the pressure introduction port 16. It is, however, also possible to form the lead wire so that the distance D2 becomes lager than the inner diameter D3 of the port. In this variation of the lead wire, before a fixing step at which the temperature sensor (the sensing element 17 and the lead wires 19) is inserted into the port 16, the opposing portions of the lead wire 19j will be inwardly pressed, as shown in FIG. 4A and FIG. 4B, so that the distance D2 will become smaller (the distance D4) than the inner diameter D3 of the port. As a result, the pressed end of the lead wire 19j can be smoothly inserted into the port 16.

Other embodiments of this invention will be explained with reference to FIGS. 5A to 5D.

Figure 5A:
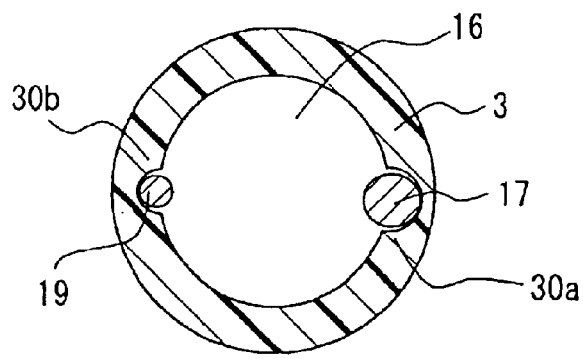
FIGS. 5A to 5D are schematic views respectively showing fixing methods of the temperature sensing element and lead wires to the pressure introduction port according to a second embodiment of the present invention.

FIG. 5A shows a cross-sectional view of the pressure introduction port 16, the lead wire 19b and the sensing element 17. In this embodiment, concaves 30a and 30b are provided at the inner wall of the port 16, so that the lead wire 19b and the temperature sensing element 17 (as well as the lead wire 19a) are respectively partly embedded in those concaves 30a and 30b. The concaves 30a and 30b can be, for example, easily formed when the inlet port 13 is resin molded, in which dies for such resin molding are so shaped that the concaves 30a and 30b are made.

Figure 5B:
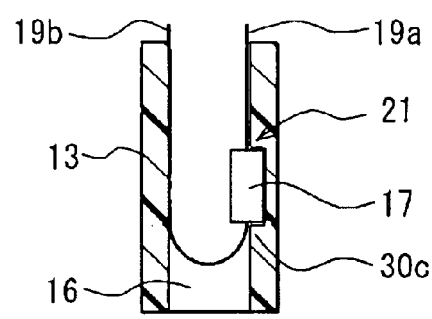

Those concaves 30a and 30b in FIG. 5A, are formed along such lines, along which the temperature sensor 21 is inserted into the port 16. The concave 30a can be, however, so made that the sensing element 17 is partly embedded as shown in FIG. 5B, in which the sensing element 17 is partly embedded in a concave 30c provided in the inner wall of the port, while the lead wire 19a is placed close to the inner wall. According to this embodiment, the sensing element 17 is furthermore rigidly held in the sensor device because the vibration of the sensing element 17 is also suppressed in a longitudinal direction. Needless to say, another concave (not shown) can be made in the inner wall of the port in the embodiment shown in FIG. 5B, so that the lead wire 19a can be likewise partly embedded in such a concave.

According to the above explained embodiments, the contacting areas of the lead wires and the sensing element with the inner wall of the pressure introduction port 16 are made larger than the first embodiment, and therefore, the vibration of the sensor 21 can be further suppressed. In addition, since the lead wire(s) and the sensing element are partly embedded in the inner wall of the pressure introduction port 16, the passage through which the measuring object flows can be made wider, or adversely the outer diameter of the inlet port 13, i.e. the port 16 can be made smaller.

Figure 5C:
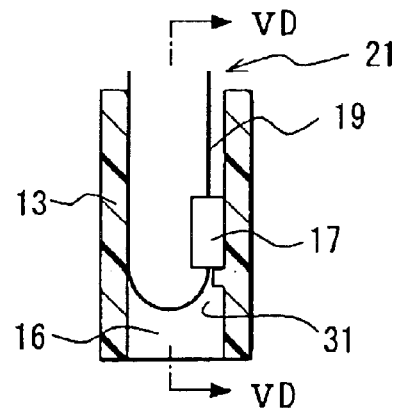
Figure 5D:
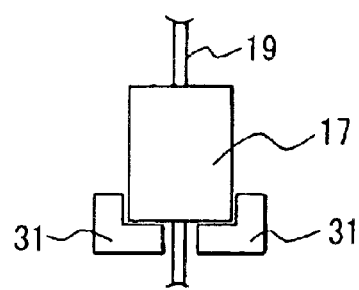
Figure 6:
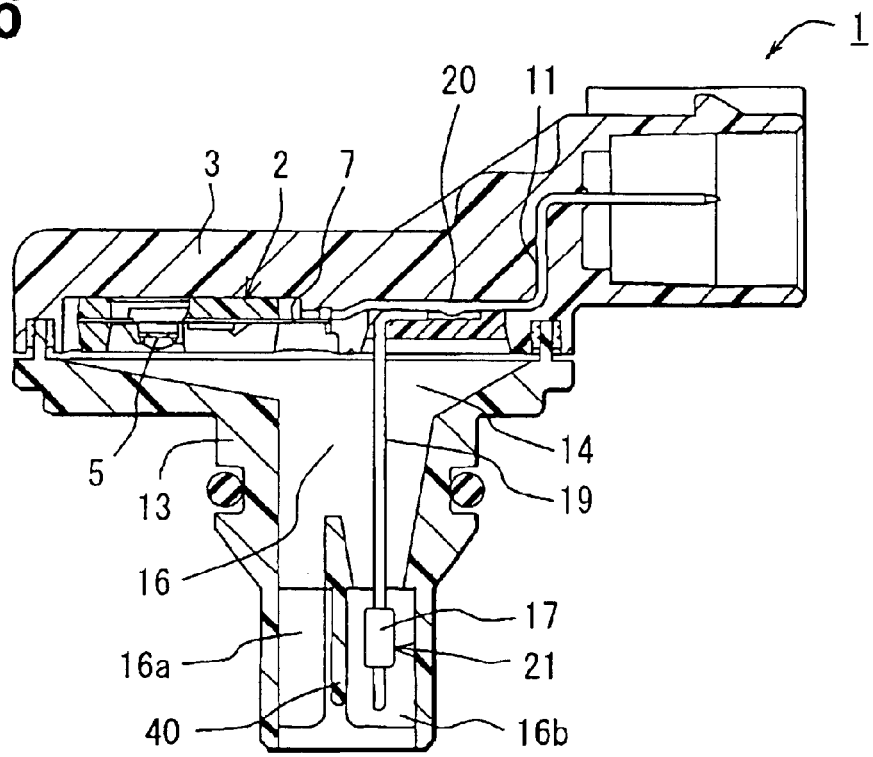
FIG. 6 is a cross-sectional view showing a prior art pressure sensor device.

According to further embodiments shown in FIGS. 5C and 5D, a pair of convexes 31 can be formed in the inner wall of the port 16, so that both sides as well as a lower end of the temperature sensing element 17 become in contact with the convexes 31, which also improves the suppression of the vibration. Further, other convexes (not shown) can be so formed in the inner wall of the port as to form a longitudinal groove so that the lead wire 19b can be held by the groove.

A combination of the above concaves 30 and convexes 31 can be also possible. In the above explained embodiments, lead wire(s) and the temperature sensing element are partly in contact with the inner wall of the pressure introduction port. It is, however, further possible that the lead wire(s) and/or the temperature sensing element can be additionally fixed and held by the inner wall of the port by means of adhesive materials, such as epoxy adhesive, fluorinated adhesive and so on. As already explained, the lead wires and the sensing element are outwardly urged, and therefore, when they are fixed to the inner wall of the port by use of the adhesive, the adhesion can be easily done.

Furthermore, the temperature sensing element is disposed in the pressure introduction port in the above embodiments. A temperature sensing port can be, however, independently provided in the inlet port 13, so that the temperature sensing element can be disposed in such port independently from the pressure introduction port.

As above, many other embodiments and variations can be possible, and therefore, the present invention shall not be limited to those explained above. Such changes and modifications are to be understood as being within the scope of the present invention as defined by the appended claims.

What is claimed is:

1. A pressure sensor device having a temperature sensor comprising:

a pressure sensor for detecting pressure of a measuring object;

a temperature sensor for detecting temperature of the measuring object;

a sensor casing for accommodating a connector pin and the pressure sensor, the connector pin electrically connecting the pressure sensor and an outside circuit; and an inlet port mounted on the sensor casing and having a pressure introduction port for introducing the measuring object to the pressure sensor disposed in the sensor casing;

wherein the temperature sensor comprises a temperature sensing element and a pair of lead wires and the temperature sensor is disposed in the pressure introduction port, the pair of elastically-deformable lead wires electrically connecting the temperature sensing element to the connector pin, and wherein at least one of the lead wires is elastically deformed and held in the pressure introduction port, so that a reaction force generated at the lead wire is applied to the temperature sensing element to urge the same to an inner wall of the pressure introduction port.

2. The pressure sensor device according to claim 1, wherein the lead wire generating the reaction force is so made as a U-shape, so that this lead wire and the temperature sensing element are outwardly urged to the opposing inner wall of the pressure introduction port.

3. The pressure sensor device according to one of claims 1 and 2, wherein a concave is formed at the inner wall of the pressure introduction port so that the temperature sensing element is at least partly embedded in the concave.

4. The pressure sensor device according to one of claims 1 and 2, wherein a concave is further formed at the inner wall of the pressure introduction port so that the lead wire generating the reaction force is at least partly embedded in the other concave.

5. The pressure sensor device according to one of claims 1 and 2, wherein a pair of convexes is formed at the inner wall of the pressure introduction port so that at least one of the lead wires and the temperature sensing element is interposed between and firmly held by the convexes.

6. A method of fixing a temperature sensing element to a pressure sensor device which comprises a pressure sensor for detecting pressure of a measuring object;

a temperature sensor for detecting temperature of the measuring object;

a sensor casing for accommodating a connector pin and the pressure sensor, the connector pin electrically connecting the pressure sensor and an outside circuit; and an inlet port mounted on the sensor casing and having a pressure introduction port for introducing the measuring object to the pressure sensor disposed in the sensor casing;

wherein the temperature sensor comprises a temperature sensing element and a pair of lead wires and the temperature sensor is disposed in the pressure introduction port, the pair of elastically-deformable lead wires electrically connecting the temperature sensing element to the connector pin, and wherein the method of fixing the temperature sensor to the pressure sensor device comprises:

a step of bending the pair of lead wires so that a distance between the temperature sensing element and an opposing portion of the lead wire is larger than an inner diameter of the pressure introduction port, while a distance of opposing portions of the lead wire at the lower end of the temperature sensor becomes smaller than the inner diameter of the pressure introduction port;

a step of connecting open ends of the lead wires to the connector pin;

a step of inserting the temperature sensor into the pressure introduction port of the inlet port; and a step of adhering the inlet port to the sensor casing, wherein at the step of insertion of the temperature sensor into the pressure introduction port, the lead wire will be elastically deformed so that a reaction force is generated at the lead wire and the temperature sensing element is urged to the inner wall of the pressure introduction port.

7. A method of fixing a temperature sensing element to a pressure sensor device which comprises a pressure sensor for detecting pressure of a measuring object;

a temperature sensor for detecting temperature of the measuring object;

a sensor casing for accommodating a connector pin and the pressure sensor, the connector pin electrically connecting the pressure sensor and an outside circuit; and an inlet port mounted on the sensor casing and having a pressure introduction port for introducing the measuring object to the pressure sensor disposed in the sensor casing;

wherein the temperature sensor comprises a temperature sensing element and a pair of lead wires and the temperature sensor is disposed in the pressure introduction port, the pair of elastically-deformable lead wires electrically connecting the temperature sensing element to the connector pin, and wherein the method of fixing the temperature sensor to the pressure sensor device comprises:

a step of bending the pair of lead wires so that a distance between opposing portions of the lead wires is larger than an inner diameter of the pressure introduction port, while a distance of opposing portions of the lead wire at the lower end of the temperature sensor becomes smaller than the inner diameter of the pressure introduction port;

a step of connecting open ends of the lead wires to the connector pin;

a step of inserting the temperature sensor into the pressure introduction port of the inlet port; and a step of adhering the inlet port to the sensor casing, wherein at the step of insertion of the temperature sensor into the pressure introduction port, the lead wire will be elastically deformed so that a reaction force is generated at the lead wire and the temperature sensing element is urged to the inner wall of the pressure introduction port.

8. A method of fixing a temperature sensing element to a pressure sensor device which comprises a pressure sensor for detecting pressure of a measuring object;

a temperature sensor for detecting temperature of the measuring object;

a sensor casing for accommodating a connector pin and the pressure sensor, the connector pin electrically connecting the pressure sensor and an outside circuit; and an inlet port mounted on the sensor casing and having a pressure introduction port for introducing the measuring object to the pressure sensor disposed in the sensor casing;

wherein the temperature sensor comprises a temperature sensing element and a pair of lead wires and the temperature sensor is disposed in the pressure introduction port, the pair of elastically-deformable lead wires electrically connecting the temperature sensing element to the connector pin, and wherein the method of fixing the temperature sensor to the pressure sensor device comprises:

a step of bending the pair of lead wires so that a distance of opposing portions of the lead wire at the lower end of the temperature sensor becomes larger than the inner diameter of the pressure introduction port;

a step of connecting open ends of the lead wires to the connector pin;

a step of inwardly pressing the opposing portions of the lead wire, so that such pressed opposing portions will be elastically deformed and a distance of such opposing portions become smaller than the inner diameter of the pressure introduction port;

a step of inserting the temperature sensor into the pressure introduction port of the inlet port; and a step of adhering the inlet port to the sensor casing, wherein at the step of pressing the opposing portions of the lead wire, the lead wire will be elastically deformed so that a reaction force is generated at the lead wire and the temperature sensing element is urged to the inner wall of the pressure introduction port after the temperature sensor is inserted into and fixed in the pressure sensor device.

9. The method of fixing the temperature sensing element in the pressure sensor device according to one of claims 6 to 8, wherein at the step of bending at least one of the lead wires, the lead wire will be so bent as to be a U-shape.

10. The method of fixing the temperature sensing element in the pressure sensor device according to one of claims 6 to 8, further comprises:

a step of forming a concave at the inner wall of the pressure introduction port, before the step of inserting the temperature sensor into the pressure introduction port, so that the temperature sensing element is at least partly embedded in the concave after the temperature sensor has been inserted into the pressure introduction port.

11. The method of fixing the temperature sensing element in the pressure sensor device according to one of claims 6 to 8, further comprises:

a step of forming a concave at the inner wall of the pressure introduction port, before the step of inserting the temperature sensor into the pressure introduction port, so that the lead wire generating the reaction force is at least partly embedded in the concave after the temperature sensor has been inserted into the pressure introduction port.

12. The method of fixing the temperature sensing element in the pressure sensor device according to one of claims 6 to 8, further comprises:

a step of forming a pair of convexes at the inner wall of the pressure introduction port, before the step of inserting the temperature sensor into the pressure introduction port, so that at least one of the lead wires and the temperature sensing element is interposed between the convexes.

* * * * *